United States Patent [19]
Kessinger, Jr.

[11] 3,907,382
[45] Sept. 23, 1975

[54] MOUNTING FOR IDLER SPROCKET

[75] Inventor: Orville E. Kessinger, Jr., Peoria, Ill.

[73] Assignee: Caterpillar Tractor Company, Peoria, Ill.

[22] Filed: Aug. 2, 1974

[21] Appl. No.: 494,299

[52] U.S. Cl. .................................. 305/10; 305/30
[51] Int. Cl.² ........................................ B62D 55/10
[58] Field of Search .............. 305/10, 16, 30, 31, 29

[56] References Cited
UNITED STATES PATENTS

| | | | |
|---|---|---|---|
| 2,506,619 | 5/1950 | Schwartz | 305/31 |
| 3,382,013 | 5/1968 | Toth | 305/30 |
| 3,841,715 | 10/1974 | Comer | 305/10 |

*Primary Examiner*—Philip Goodman
*Attorney, Agent, or Firm*—Ralph E. Walters

[57] ABSTRACT

An improved mounting for an idler sprocket on the track roller frame of a crawler-type tractor. The improved mounting incorporates a readily accessible slide bearing structure provided on the exterior surfaces of the legs of a yoke which mounts the idler sprocket for movement on a subjacent track frame. Secured to the track frame are clamps having horizontally elongated fingers received in recesses defining the bearing surfaces on the outer sides of the legs. The slide bearing surfaces can be readily inspected and serviced by reason of their location on the exterior of the construction.

5 Claims, 4 Drawing Figures

MOUNTING FOR IDLER SPROCKET

BACKGROUND OF THE INVENTION

This invention relates to mounting constructions for mounting the idler sprocket employed in a track chain assembly for reciprocal movement on a track roller frame, and more specifically, to such a mounting wherein slide bearings are readily visible for inspection purposes and are exteriorly located for ease of servicing.

The most pertinent prior art known to the applicant includes U.S. Pat. Nos. 2,511,098; 2,683,064; 2,887,342; and 3,332,725.

The endless tracks employed in crawler-type tractors are typically trained about a drive sprocket and an idler sprocket mounted on a so-called track roller frame. Typically, the drive sprocket will be at the rear of the frame while the idler sprocket will be at the forward end thereof.

Almost universally, the idler sprocket is attached to the track roller frame for longitudinal sliding movement thereon to allow for adjustment of the track and to provide some measure of recoil should objects become caught between the tracks and the rollers, the idler, or the main drive sprocket. As a result, the mountings for the idler sprockets typically have been provided with slides and guides as well as bearings to facilitate such longitudinal sliding movement. Because such components are located on the track roller frames, they are subjected to substantial wear because of high loads imposed thereon when the vehicle is traveling over extremely rough terrain or during turning movements. Moreover, such components are relatively exposed with the result that abrasive foreign matter may easily enter the bearing components to accelerate the wear of the parts thereof.

It has therefore been necessary to maintain a very diligent maintenance program to insure that servicing of such mountings is not overlooked. This, in turn, is difficult simply because of the human factor involved. Moreover, even when a satisfactory maintenance program is conducted, because ice, mud, or the like, often coats many of the components of the mounting, the inspection thereof is made difficult.

When inspection suggests that servicing is required, still another difficulty presents itself. The mounting systems typically employed in the art are quite complex and are located internally of the overall construction, i.e., generally between the idler sprocket and the side rails of the track roller frame. Thus, considerable time must be expended to dismantle and reassemble replaceable bearing plates, spacers, shims or the like that are employed.

SUMMARY OF THE INVENTION

It is the principal object of the invention to provide a new and improved mounting for idler sprockets on track roller frames in crawler-type vehicles. More specifically, it is an object of the invention to provide such a mounting wherein inspection and servicing are facilitated.

The exemplary embodiment of the invention achieves the foregoing objects in a structure including a track roller frame which is bifurcated at the forward end thereof. Mounted for movement on the bifurcated end of the track roller frame is a yoke having spaced apart legs, which yoke will typically be connected to a conventional cushioning device.

The yoke mounts, between the legs thereof, the ends of a shaft by which the idler sprocket is mounted for rotation. In addition, the exterior surfaces of both legs are provided with horizontally extending recesses, each including at least one bearing surface therein. Clamping plates are removably secured to the exterior surfaces of the bifurcated portion of the track frame and extend upwardly thereof to terminate in horizontally elongated fingers, each having a bearing surface which is received in a corresponding one of the recesses, such that the bearing surface on the finger is in slidable engagement with the bearing surface in the recess.

Moreover, preferred embodiments of the invention will include recesses that have vertical surfaces therein and the fingers on the corresponding clamping plates will have vertical surfaces in close adjacency to the vertical surfaces in the corresponding ones of the recesses to restrict lateral movement of the yoke relative to the track frame.

Means are also provided whereby the relationship of the bearing surfaces to each other can be appropriately adjusted. In the preferred embodiment, an adjustable means is provided in each of the legs of the yoke and includes a portion extending downwardly therefrom to engage the upper surface portion of an underlying part of the track frame. The vertical attitude of the adjustable member can be selectively adjusted so as to effect the interrelationship between the bearing surfaces mentioned previously.

In a highly preferred embodiment, each such adjustable means includes a downwardly opening bore in a corresponding one of the legs of the yoke which, in turn, receives a piston. The lower end of the piston is in engagement with an underlying rod within the bore and mounts a wear plate in engagement with an underlying portion of the track frame. The upper end of the bore is closed by a means which will selectively allow the introduction and retention of a fluid under pressure within the bore. According to the preferred embodiment, such a means is a conventional grease fitting and the fluid employed to urge the piston downwardly is grease.

Other objects and advantages will become apparent from the following specification taken in conjunction with the accompanying drawings.

DESCRIPTION OF THE PREFERRED EMBODIMENT

Figure 1:
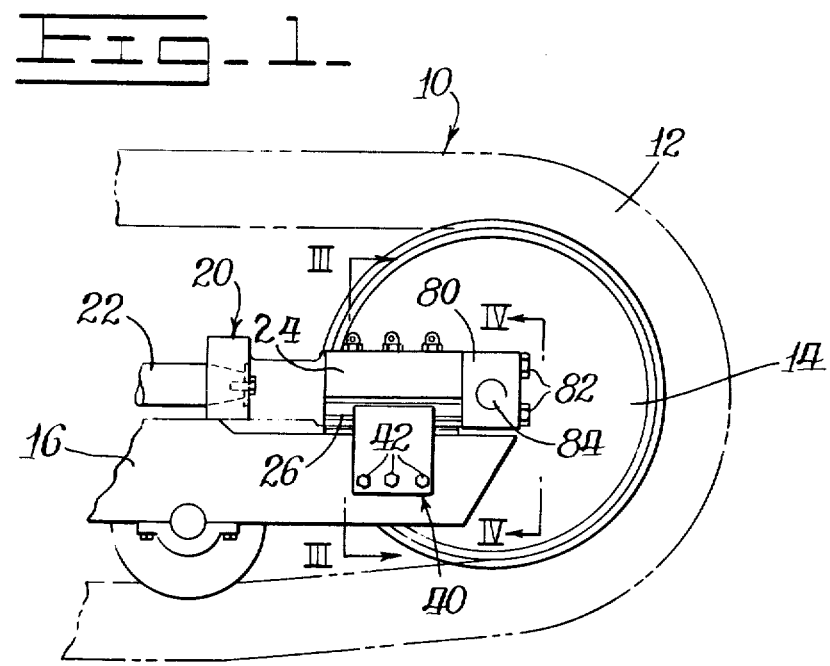
FIG. 1 is a fragmentary side elevation of the forward portion of the track roller frame of a crawler-type vehicle embodying a mounting for an idler sprocket made according to the invention.
Figure 3:
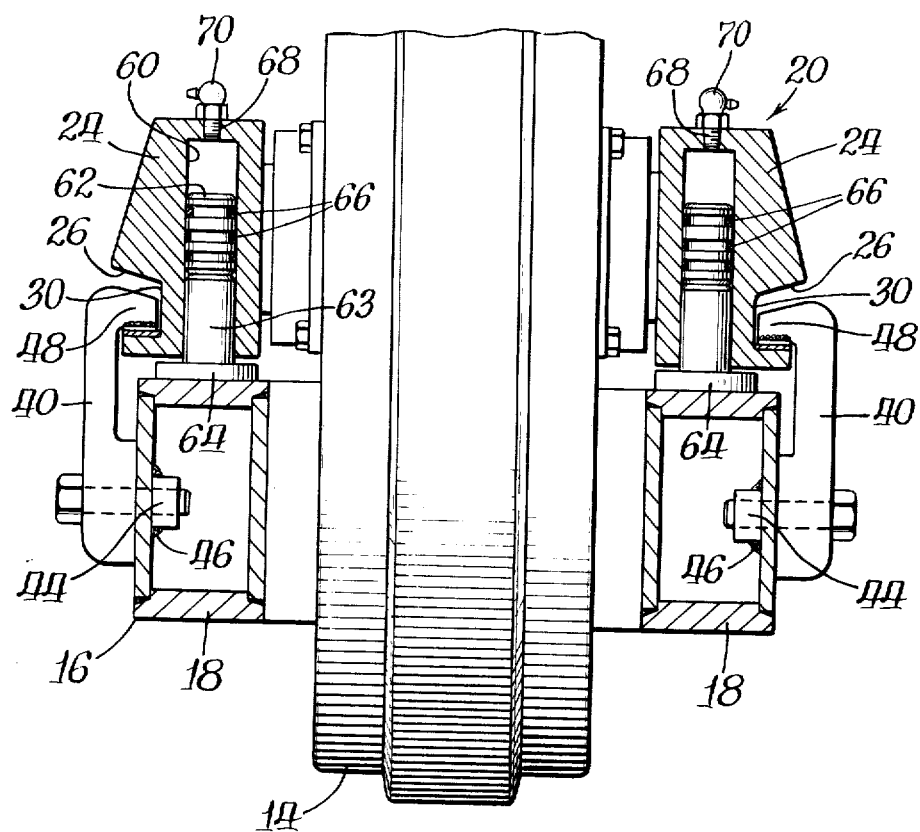
FIG. 3 is a vertical section taken approximately along the line 3—3 of FIG. 1.

A track chain assembly, generally designated 10, embodying the invention, is illustrated in FIG. 1 and is seen to include an endless track 12 trained about an idler sprocket 14 mounted on the forward end of a bifurcated track frame 16. As seen in FIG. 3, the bifurcated end of the track frame 16 is defined by a pair of spaced box beams 18 which sandwich the idler sprocket 14.

Figure 4:
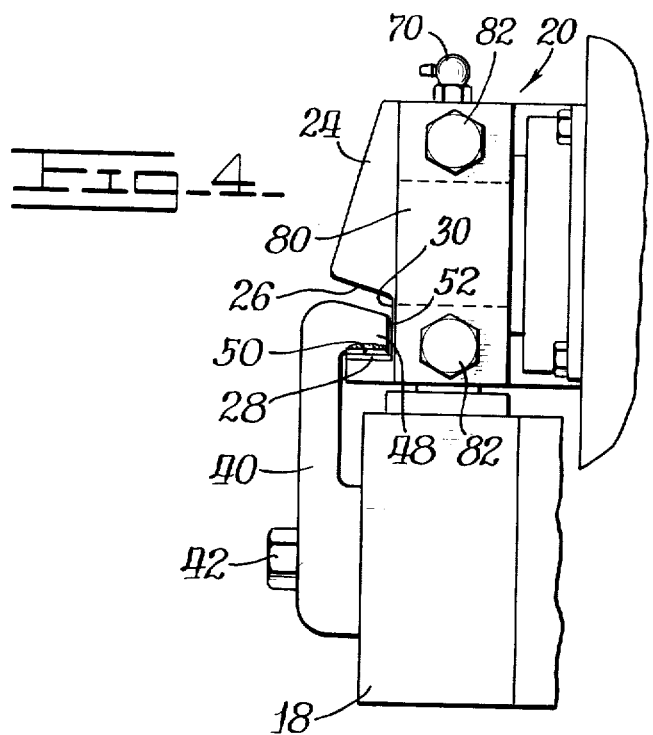
FIG. 4 is a fragmentary, enlarged view taken approximately along the line 4—4 of FIG. 1.

Above the bifurcated end of the track frame 16 is a yoke, generally designated 20, having its bight connected to the rod 22 of a conventional track tension apparatus (not shown). The yoke 20 includes a pair of forwardly directed legs 24 which flank the idler sprocket 14, as best seen in FIG. 3, and in addition, overlie the bifurcated portions or box beams 18 of the track roller frame 16. As seen in the various Figures, the legs 24 are solid and may be formed of castings or the like and include horizontally elongated recesses 26 on the exterior surfaces thereof. As best seen in FIGS. 3 and 4, the lowermost surface of each recess 26 is horizontal and includes an upwardly facing, hardened wear strip 28 which serves as a bearing surface. Adjacent each bearing surface defined by a wear strip 28 is a vertically extending surface 30 which, as will be seen, acts in conjunction with other elements of the construction to restrict lateral movement of the yoke 20 relative to the underlying track frame 16.

Secured to the exterior surface of each of the box beams 18 comprising the bifurcated portion of the track frame 16, is a clamping plate, generally designated 40. The same is secured to the corresponding box beam surface by means of bolts 42 extending through suitable apertures therein to be received in nuts 44 secured as by welds 46 to the interior of each box beam 18.

Figure 2:
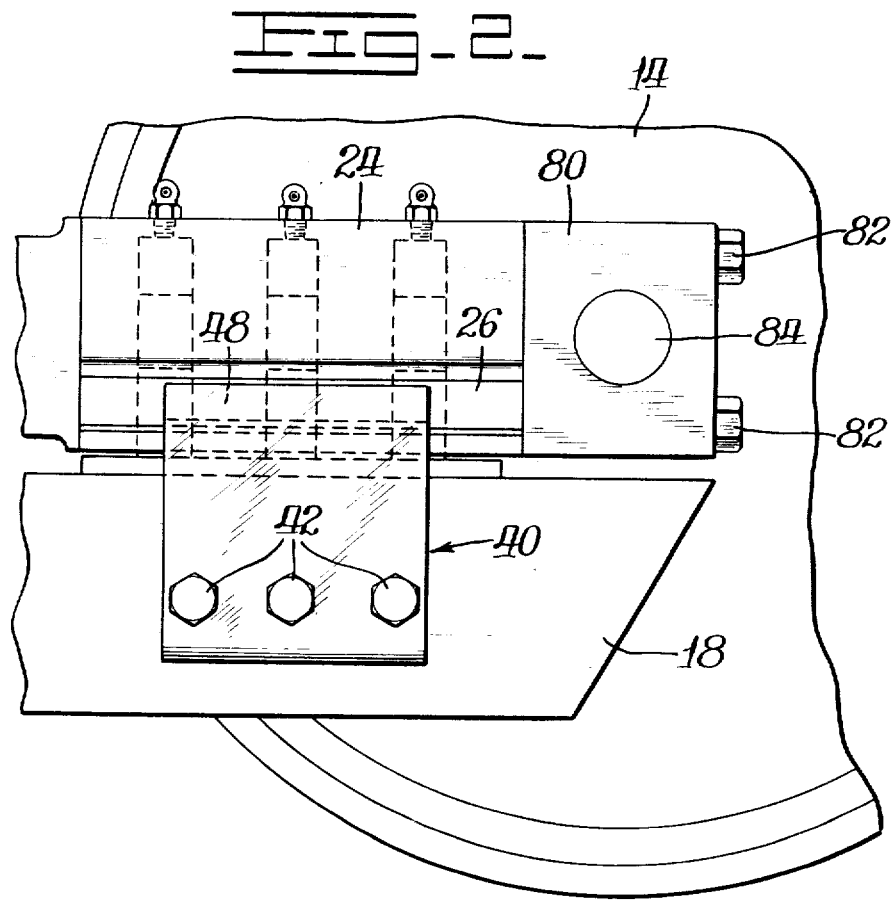
FIG. 2 is a further enlarged, even more fragmentary, vertical section of the mounting.

As can be best seen in FIGS. 2–4, inclusive, the upper end of each clamping plate 40 includes a horizontally elongated, inwardly directed finger 48 having a horizontal lower surface mounting a hardened wear strip 50 for engagement with the wear strip 28. The wear strip 50, like the wear strip 28, serves as a bearing surface and the two together form slide bearings to facilitate longitudinal movement of the idler sprocket 14 on the track frame. In this respect, it should be noted that one or both of the wear strips 28 and 50 may be disposed respectively on the yoke leg 24 and the finger 48 in a removable fashion so that they may be easily replaced when worn without requiring disposal of the yoke 20 or the clamping plate 40.

FIGS. 3 and 4 also illustrate that the inwardly directed end of each finger 48 terminates in a vertically arranged surface 52 which is in close adjacency to the vertically arranged surface 30 in the corresponding one of the recesses 26. Thus, the surfaces 30 and 52 cooperate, as mentioned previously, to restrict lateral movement of the yoke 20 relative to the underlying track frame 16.

As seen in FIGS. 2 and 3, each of the legs 24 is provided with downwardly opening, interior bores 60 which, in turn, slidably receive pistons 62. The lower end of each piston 62 engages a slidable hardened push rod 63 reciprocally received in each bore 60. The rods 63 on each leg, in turn, mount a single wear plate 64 which is adapted to engage the upper surface of the corresponding one of the box beams 18 for slidable movement thereon. It will be appreciated that the downward pressure applied to the piston 62 affects the disposition of the bearing surfaces defined by the wear strips 28 and 50, and thus, by controlling the pressure applied to the upper end of the piston 62, service adjustment of the slide bearings can be effected.

Each piston 62 is provided with a plurality of annular seals, such as O-rings 66, to preclude substantial flow of fluid therepast. Such fluid may be introduced under pressure into the upper end of each bore 60 by means of a conduit 68 which is, in turn, closed by a valve structure 70. The valve structure 70 allows the directing of fluid under pressure into the bore 60 above the piston 62 while precluding escape of such fluid under pressure therefrom. In a highly preferred embodiment of the invention, the fluid employed is a heavy grease and the valve structure 70 is a conventional grease fitting.

The idler sprocket 14 is secured to the yoke 20 by means of a pair of bearing blocks 80 secured to the ends of corresponding ones of the legs 24 by cap screws 82. The bearing blocks 80 rotatably receive a shaft 84 on which the idler sprocket 14 is mounted.

From the foregoing it will be appreciated that a mount for an idler sprocket made according to the invention possesses substantial advantages over those heretofore known. For example, the exterior location of the slide bearings renders servicing more feasible as well as makes it possible for rapid visual inspection of the bearing surfaces defined by the wear strips 28 and 50. Thus, inspection programs are facilitated as well as servicing when required. Moreover, because the bearings are located in recesses, which recesses are located above the track frame, the higher position of the bearings results in less exposure of the same to foreign material of an abrasive character.

The use of the grease-driven pistons 62 provides an easily used, simple means whereby the requisite sliding and clamping contact within the assemblage can be achieved and maintained.

I claim:

1. A mounting for an idler sprocket on a track roller frame for crawler-type tractors, comprising: a bifurcated track roller frame; a yoke having spaced apart legs mounted for movement on said frame; an idler sprocket disposed between said legs and in the bifurcated portion of said frame; means rotatably mounting said idler sprocket on the ends of said legs; said legs on the surfaces thereof laterally remote from said sprocket, each including a generally horizontally extending recess having at least one bearing surface; and a pair of clamps, one for each recess, removably secured to opposite sides of said frame laterally remote from said sprocket, each said clamp including a horizontally elongated finger directed laterally inwardly towards said sprocket and being provided with a bearing surface disposed in a corresponding one of said recesses with the bearing surface of each finger in sliding engagement with the bearing surface of the corresponding recess.

2. A mounting according to claim 1 wherein said bearing surfaces are generally horizontal and wherein the legs of said yoke overlie a portion of the frame; each said leg further including vertically adjustable means for slidably engaging an underlying portion of the frame whereby pressure on said bearing surfaces can be selectively adjusted.

3. A mounting for an idler sprocket on a track roller frame for crawler-type tractors, comprising: a bifurcated track roller frame; a yoke having spaced apart legs mounted for movement on said frame; an idler sprocket disposed between said legs and in the bifurcated portion of said frame; means rotatably mounting said idler sprocket on the ends of said legs; said legs, on the surfaces thereof laterally remote from said sprocket, each including a generally horizontally extending recess having at least one bearing surface; a pair of clamps, one for each recess, removably secured to opposite sides of said frame laterally remote from said sprocket, each said clamp including a horizontally elongated finger directed laterally inwardly towards said sprocket and being provided with a bearing surface disposed in a corresponding one of said recesses with the bearing surfaces of each finger in sliding engagement with the bearing surface of the corresponding recess; said bearing surfaces being generally horizontal and the legs of said yoke overlying a portion of the frame; each said leg further including vertically adjustable means for slidably engaging an underlying portion of the frame whereby pressure on said bearing surfaces can be selectively adjusted; each of said vertically adjustable means including a downwardly open bore in the corresponding leg of said yoke, piston means disposed in said bore and having a portion extending outwardly thereof to engage the underlying frame portion; and means whereby a fluid under pressure may be selectively introduced and retained in said bore to urge said piston means into engagement with the underlying frame portion.

4. A mounting according to claim 3 wherein said means for selectively introducing and retaining grease in said bore includes a grease fitting.

5. A mounting according to claim 1 wherein each of said recesses includes a vertically extending surface and each of said fingers further includes a vertically extending surface in close proximity to the corresponding vertical surface of the corresponding recess whereby said vertical surfaces may engage each other to limit lateral movement of said yoke on said frame.

* * * * *

UNITED STATES PATENT OFFICE
CERTIFICATE OF CORRECTION

PATENT NO. : 3,907,382
DATED : September 23, 1975
INVENTOR(S) : Orville E. Kessinger, Jr.

It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this sixteenth Day of December 1975

[SEAL]

Attest:

RUTH C. MASON
*Attesting Officer*

C. MARSHALL DANN
*Commissioner of Patents and Trademarks*